3,248,370
POLYURETHANE PROCESS UTILIZING A DIISOCYANATE MIXTURE

Artur Reischl, Wilhelm Kallert, and Erwin Muller, Leverkusen, Germany, assignors to Farbenfabriken Bayer Aktiengesellschaft, Leverkusen, Germany, a German corporation
No Drawing. Filed Oct. 23, 1962, Ser. No. 232,600
Claims priority, application Germany, Oct. 31, 1961, F 35,257
15 Claims. (Cl. 260—75)

This invention relates to polyurethane plastics and a method of preparing the same. More particularly it relates to polyurethane plastics which exhibit thermoplastic properties and which can be prepared by admixing the reaction components and permitting the reaction to proceed to an intermediate condition and subsequently further processing this material into the desired configuration without the addition of further reaction components by the application of heat or the application of both heat and pressure.

It has been heretofore known to react polyhydroxyl compounds having a relatively high molecular weight such as polyesters with uretdione diisocyanates. The free —NCO groups first react to cause lengthening of the chain and finally the uretdione groups split, thus supplying further —NCO groups for cross-linking.

It has been further heretofore known to prepare hydroxyl containing millable gums by reacting a polyhydroxyl compound, a diisocyanate and a chain-extending agent. These millable gums are storage stable and may be rolled into a sheet. Subsequently, a uretdione diisocyanate is incorporated into the millable gum by rolling or by other processes usual in the rubber industry and the material is shaped and heated to cause the breaking of the uretdione group into free —NCO groups to complete cross-linking.

It has further been heretofore known to proceed via a casting process, whereby a polyhydroxyl compound is reacted with an excess of a uretdione diisocyanate, calculated on the free —NCO groups, at 100 to 150° C. and the reaction product is reacted with a compound containing at least two reactive hydrogen atoms, perhaps a diol, at the time or at a lower temperature, while shaping.

These techniques while they provide products having good properties are disadvantageous for the reasons that they are limited to particular processing methods such as casting or they are involved procedures because of the number of reactions conducted and the order of addition of the reaction components required.

It is therefore an object of this invention to provide an improved method of making non-porous polyurethane plastics. It is another product of this invention to provide polyurethane polymers having thermoplastic properties suitable for fabrication into the desired configuration. It is still another object of this invention to provide storage stable polyurethane polymers having thermoplastic properties. It is a further object of this invention to provide a method for the preparation of polyurethane polymers which can be fabricated into the desired configuration without the addition of further reaction components.

The foregoing objects and others which will become apparent from the following description are accomplished in accordance with the invention generally speaking by providing polyurethane polymers having thermoplastic properties by reacting at a temperature less than 100° C. an organic compound containing active hydrogen atoms as determined by the Zerewitinoff test, which atoms are reactive with —NCO groups and having a molecular weight of from 500 to about 3000 and a chain-extending agent selected from water and dihydric alcohols with a mixture of a uretdione diisocyanate and a monomeric organic diisocyanate, wherein the mixture is at least 50% by weight of monomeric organic diisocyanate, the quantity of the mixture added to the organic compound containing active hydrogen atoms and the chain-extending agent is such that the —NCO groups and active hydrogen atoms are present in substantially equivalent quantities. Thus, the invention contemplates a thermoplastic polyurethane polymer by reacting at a temperature of less than 100° C. an organic polymeric compound containing active hydrogen atoms, a chain-extending agent and a diisocyanate mixture of a uretdione diisocyanate and a monomeric organic diisocyanate in a quantity such that the NCO to OH ratio varies from about 0.9 to about 1.2, and preferably from about 0.95 to about 1.15 where the mixture of diisocyanates contains at least 50% by weight of monomeric organic diisocyanate.

It is essential that the reaction be conducted at a temperature less than 100° C. to prevent the uretdione diisocyanate from splitting and thus liberating more —NCO groups which will cause the cross-linking of the polyurethane polymer and prevent the subsequent fabrication by thermoplastic techniques into the desired configuration. While it has been heretofore known to produce polyurethane polymers having thermoplastic properties close tolerances of the quantities of the reaction components have always been required because of the possibility of the cross-linking occurring. By the process of this invention the tolerances are more greatly expanded without fear of cross-linking.

Any suitable organic compound containing active hydrogen atoms which are reactive with —NCO groups and having a molecular weight of from about 500 to about 3000 may be used such as, for example, hydroxyl polyesters, polyester amides, polyhydric polyalkylene ethers, polyhydric polythioethers, polyacetals and the like. Any suitable hydroxyl polyester may be used such as, for example, the reaction product of a dicarboxylic acid and a dihydric alcohol. Any suitable dicarboxylic acid may be used in the preparation of the polyesters such as, for example, adipic acid, succinic acid, suberic acid, sebacic acid, oxalic acid, methyl adipic acid, glutaric acid, pimelic acid, azelaic acid, phthalic acid, terephthalic acid, isophthalic acid, thiodiglycollic acid, thiodipropionic acid, maleic acid, fumaric acid, citraconic acid, itaconic acid, and the like. Of course, the corresponding acid anhydrides may also be used. Any suitable dihydric alcohol may be used in the preparation of the polyesters such as, for example, ethylene glycol, propylene glycol, hexanediol, bis-(hydroxymethyl cyclohexane), 1,4-butanediol, 1,3-butanediol, diethylene glycol, polyethylene glycol, 2,2-dimethyl propylene glycol, xylylene glycol and the like.

Any suitable polyhydric polyalkylene ether may be used such as, for example, the condensation product of an alkylene oxide with a small amount of a compound containing active hydrogen containing groups such as, for example, water, ethylene glycol, propylene glycol, butylene glycol, amylene glycol and the like. Any suitable alkylene oxide condensate may also be used such as, for example, condensates of ethylene oxide, propylene oxide, butylene oxide, amylene oxide, styrene oxide, and mixtures thereof. The polyalkylene ethers prepared from tetrahydrofuran may also be used. The polyhydric polyalkylene ethers may be prepared by any known process such as, for example, the process described by Wurtz in 1859 and in the "Encyclopedia of Chemical Technology"; volume 7, pages 257 to 262, published by Interscience Publishers in 1951, or in U.S. Patent 1,922,459.

Any suitable polyhydric polythioether may be used such as, for example, the reaction product of one of the aforementioned alkylene oxides used in the preparation of the polyhydric polyalkylene ether with a polyhydric thioether such as, for example, thiodiglycol, 3,3'-dihydroxy propyl sulphide, 4,4'-dihydroxyl butyl sulphide, 1,4-($\beta$-hydroxy ethyl) phenylene dithioether and the like.

Any suitable polyester amide may be used such as, for example, the reaction product of an amine and/or amino alcohol with a carboxylic acid. Any suitable amine such as, for example, ethylene diamine, propylene diamine, and the like may be used. Any suitable amino alcohol such as, for example, $\beta$-hydroxy ethyl amine and the like may be used. Any suitable polycarboxylic acid may be used such as, for example, those more particularly described above for the preparation of the hydroxyl polyesters. Further, a mixture of a glycol and an amino alcohol or polyamine may be used. Any of the glycols mentioned for the preparation of the polyesters may be used.

Any suitable polyacetal may be used such as, for example, the reaction product of an aldehyde and a polyhydric alcohol. Any suitable aldehyde may be used such as, for example, formaldehyde, paraldehyde, butylaldehyde and the like. Any of the polyhydric alcohols mentioned above in the preparation of the hydroxyl polyesters may be used. Any of the polyacetals set forth in U.S. Patent 2,961,428 may be used.

While the organic compound containing active hydrogen atoms should have a molecular weight of from about 500 to about 3000 it is preferred that the molecular weight be from about 1500 to about 2500.

As stated above in the diisocyanate mixture the monomeric organic diisocyanate is present in a quantity of at least 50% by weight based on the weight of the mixture and preferably in a quantity from about 75% by weight to about 95% by weight. Thus, the uretdione diisocyanate is preferably present in an amount of from about 5% by weight to about 25% by weight.

Any suitable monomeric organic diisocyanate may be used in the practice of this invention such as, for example, ethylene diisocyanate, ethylidene diisocyanate, propylene diisocyanate, butylene diisocyanate, cyclopentylene-1,3-diisocyanate, cyclohexylene-1,4-diisocyanate, cyclohexylene-1,2-diisocyanate, 2,4-toluylene diisocyanate, 2,6-toluylene diisocyanate, 4,4'-diphenyl methane diisocyanate, 2,2'-diphenyl propane-4,4'-diisocyanate, 3,3'-dimethyl diphenyl methane-4,4'-diisocyanate, p-phenylene diisocyanate, m-phenylene diisocyanate, dibenzyl-4,4'-diisocyanate, xylylene diisocyanate, 1,4-naphthylene diisocyanate, 1,5-naphthylene diisocyanate, diphenyl-4,4'-diisocyanate, azobenzene-4,4'-diisocyanate, diphenyl sulphone-4,4'-diisocyanate, dichlorohexamethylene diisocyanate, tetramethylene diisocyanate, pentamethylene diisocyanate, hexamethylene diisocyanate, 1-chlorobenzene-2,4-diisocyanate, furfurylidene diisocyanate, 2,7-diisocyanate-dibenzofuran and the like. It is preferred however, that the aromatic diisocyanates be used. Any suitable uretdione diisocyanate may be used such as, for example, the dimers of any of the above mentioned diisocyanates. It is preferred to use the dimeric 2,4-toluylene diisocyanates.

Any suitable chain-extending agent free of amino groups such as, for example, water and dihydric alcohol such as, for example, ethylene glycol, propylene glycol, 1,4-butanediol, 2,3-butanediol, 1,3-butanediol, diethylene glycol, triethylene glycol, 1,4-cyclohexylene glycol, hydroquinone-di-$\beta$-hydroxyethylether and the like may be used. Preferably the glycols should have a molecular weight below about 600. It is possible to concurrently use trihydric alcohols such as trimethylolpropane and glycerine to a small extent. The extruder should be free of amino groups as these groups cause unwanted cross-linking thus preventing the formation of a thermoplastic intermediate.

The process in accordance with this invention is preferably carried out by dissolving the uretdione diisocyanate in the dehydrated organic compound containing active hydrogen atoms and adding the monomeric organic diisocyanate at substantially the same temperature. The difunctional chain-extender can be either disposed in the organic compound containing active hydrogen atoms or it can be added after reaction with the diisocyanates. All reactions are carried out at temperatures below about 100° C. and preferably at a temperature of from about 60 to about 95° C. The quantities are so maintained that practically all free —NCO groups of the diisocyanates are consumed by the reactive hydrogen atoms of the other reactants. The NCO to OH ratio is from about 0.9 to about 1.2. The quantity of the uretdione diisocyanate substantially determines the degree of cross-linking of the subsequent elastomers, and this cross-linking can be varied as desired by varying the ratio of the diisocyanates in the diisocyanate mixture. Furthermore, the quantity of the polyfunctional extending agent which is used in the reaction is also of influence.

A clear melt is obtained, which is poured into containers and advantageously finally heated for 2 to 20 hours at about 80 to 100° C. The product of the process is a thermoplastic polyurethane composition, the storability of which is so great that there is no modification of the deformation values, even after several months. It can be satisfactorily rolled and made-up, and fillers such as carbon black or silicic acid aerogels can be incorporated if required. Such fillers can cause an increase in the mechanical properties, such as tensile strength in elasticity. Both the unfilled and the filled product obtained by the process can be stored satisfactorily without any modification. The thermoplastic products obtained by the process can be pressed or extruded and calendered at temperatures above 100° C., and if required can also be processed by injection molding techniques, and are advantageously finally heated at 90 to 110° C. From a technological point of view, the novel, thermoplastic, rubberlike polyurethane compositions obtained according to the invention offer the advantage that there are thereby made available polyurethanes which can be stored and transported for an unlimited period without the need to incorporate beforehand any further diisocyanate or other "vulcanizing agents" when the required molding or shaping is carried out. In this conection, with the prior known processes after the incorporation of the cross-linking agent, changes in the material are very quickly caused by premature reactions which occur even at room temperature and these changes make the processing difficult. The polymers can be used for producing soles and heels for shoes, shock absorbers, ball joints, bearings, fibers, tubing, film sheets, coatings and the like.

The invention is further illustrated but not limited by the following examples, in which parts are by weight unless otherwise specified.

*Examples 1 to 7*

The quantities of dimeric toluylene-2,4-diisocyanate as indicated in the following table are incorporated below about 95° C. in each case into about 1000 parts of a polyester dehydrated at about 130° C./12 mm. Hg until dissolved and then the indicated quantity of further monomeric diisocyanate is incorporated at about 90° C. The indicated quantity of chain-extender is then added at the same temperature. The reaction temperature is kept below about 95°, if required by cooling. The clear melt is finally heated in molds for about 2½ hours at from about 85 to 95° C. and then a storable intermediate product can be removed while cold from the mold.

| Example | Polyester | Parts Dimeric toluylene diisocyanate | Parts Monomeric diisocyanate | Parts chain-extender |
|---|---|---|---|---|
| 1 | I | 100 | 140 D | 33.5 B |
| 2 | I | 50 | 180 D | 33.5 B |
| 3 | I | 25 | 212 DB | 33.5 B |
| 4 | I | 50 | 130 T | 32.5 B |
| 5 | I | 25 | 205 T | 12 W |
| 6 | II | 76.5 | 107 D | 25.6 B |
| 7 | III | 100 | 178 D | 39.4 B |

I = Glycol-adipic acid polyester, OH— number 56, acid number 1.
II = Diethylene glycol-adipic acid polyester, OH— number 42, acid number 2.
III = 2,3-butanediol-1,6-hexanediol-adipic acid polyester (glycol ratio 1:2), OH— number 66, acid number 1.
D = Diphenyl methane-4,4'-diisocyanate.
DB = Dibenzene-4,4'-diisocyanate.
T = Toluylene 2,4-diisocyanate.
B = Butane-1,4-diol.
W = Water.

About 1000 parts of one of the products are mixed at room temperature on a roller with about 5 parts of stearic acid, about 200 parts of silicic acid aerogel or about 200 parts of active carbon black and finally about 3 parts of lead-ethyl phenyl dithiocarbamate are incorporated by rolling.

The final cross-linking of the thermoplastic is preferably effected in molds at about 130° C. at a pressure of from about 10 to about 20 kg./cm.$^2$ for from about 5 to about 15 minutes. To complete the reaction, the material removed from the mold is finally heated for about 20 hours at about 100° C.

| Example | A | | B | C | D | E | F |
|---|---|---|---|---|---|---|---|
| | a | b | | | | | |
| 1 | 20 | | 296 | 635 | 7 | 72 | 60 |
| 1 | | 20 | 325 | 570 | 7 | 52 | 65 |
| 1 | 40 | | 318 | 590 | 14 | 66 | 80 |
| 1 | | 40 | 349 | 445 | 7 | 68 | 76 |
| 1 | | 60 | 364 | 280 | 5 | 82 | 90 |
| 2 | 20 | | 220 | 815 | 23 | 38 | 60 |
| 2 | | 20 | 260 | 650 | 11 | 41 | 60 |
| 3 | | 20 | 209 | 345 | 14 | 48 | 75 |
| 4 | 20 | | 150 | 530 | 24 | 39 | 58 |
| 5 | | 20 | 244 | 405 | 11 | 48 | 74 |
| 6 | | 40 | 202 | 390 | 5 | 35 | 72 |
| 7 | 20 | | 268 | 580 | 11 | 37 | 66 |
| 7 | | 20 | 314 | 585 | 8 | 28 | 69 |

A = percentages by weight incorporated by rolling, a = silicic acid aerogel, b = carbon black.
B = tensile strength according to DIN 53504 kg./cm.$^2$
C = breaking elongation, percent.
D = elongation one minute after tearing, percent.
E = structural strength ring, kg./absolute.
F = Shore hardness A according to DIN 53505.

It is of course to be understood that the foregoing examples are for the purpose of illustrating the invention and the invention is not to be limited thereby. Further, any of the reactants set forth above may be used throughout the working examples in the place of the particular ones set forth therein. Thus, any of the organic compounds containing active hydrogen atoms may be used in equivalent quantities for the particular compounds used in the working examples. Further, the uretdione diisocyanate, monomeric diisocyanate or chain-extenders set forth above may be substituted into the working examples for those used therein.

Although the invention has been described in considerable detail for the purpose of illustration, it is to be understood that variations can be made by those skilled in the art without departing from the spirit of the invention and scope of the claims.

What is claimed:
1. A method of preparing non-porous polyurethane polymers having thermoplastic properties which comprises reacting at a temperature less than 100° C. an organic compound containing active hydrogen atoms which are reactive with —NCO groups, said compound having a molecular weight of from about 500 to about 3000 and a chain-extending agent selected from the group consisting of water and glycols with a diisocyanate mixture of at least 5% by weight of a uretdione diisocyanate and at least 50% by weight of a monomeric organic diisocyanate, said diisocyanate mixture being present in quantity substantially stoichiometrically equivalent to all the active hydrogen atoms present.

2. A method of preparing non-porous polyurethane polymers having thermoplastic properties which comprises reacting at a temperature less than 100° C. an organic compound containing active hydrogen atoms which are reactive with —NCO groups said compound having a molecular weight of from about 500 to about 3000 and a chain-extending agent selected from the group consisting of water and glycols, with a diisocyanate mixture of at least 5% by weight of a uretdione diisocyanate and at least 50% by weight of a monomeric organic diisocyanate, said diisocyanate mixture being present in a quantity such that the —NCO to —OH ratio is from about 0.9 to about 1.2.

3. A method of preparing non-porous polyurethane polymers having thermoplastic properties which comprises reacting at a temperature less than 100° C. an hydroxyl polyester having a molecular weight of from about 500 to about 3000 and prepared by the process which comprises reacting a dihydric alcohol with a dicarboxylic acid and a chain-extending agent selected from the group consisting of water and glycols with a diisocyanate mixture of at least 5% by weight of a uretdione diisocyanate and at least 50% by weight of a monomeric diisocyanate, said diisocyanate mixture being present in a quantity substantially stoichiometrically equivalent to all the active hydrogen atoms present.

4. A method of preparing non-porous polyurethane polymers having thermoplastic properties which comprises reacting at a temperature less than 100° C. an hydroxyl polyester having a molecular weight of from about 500 to about 3000 and prepared by the process which comprises reacting a dihydric alcohol with a dicarboxylic acid and a chain-extending agent selected from the group consisting of water and glycols with a diisocyanate mixture of at least 5% by weight of a uretdione diisocyanate and at least 50% by weight of a monomeric organic diisocyanate, said diisocyanate mixture being present in the quantity such that the NCO to OH ratio is from about 0.9 to about 1.2.

5. A method of preparing non-porous polyurethane polymers having thermoplastic properties which comprises reacting at a temperature less than 100° C. an organic compound containing active hydrogen atoms which are reactive with —NCO groups said compound having a molecular weight of from about 500 to about 1500 and a chain-extending agent selected from the group consisting of water and glycols, with a diisocyanate mixture of at least 5% by weight of a uretdione diisocyanate and at least 50% by weight of a monomeric organic diisocyanate, said diisocyanate mixture being present in a quantity such that the —NCO to —OH ratio is from about 0.9 to about 1.2.

6. A method of preparing non-porous polyurethane polymers having thermoplastic properties which comprises reacting at a temperature less than 100° C. an organic compound containing active hydrogen atoms which are reactive with —NCO groups said compound having a molecular weight of from about 500 to about 3000 and a chain-extending agent selected from the group consisting of water and glycols, with a diisocyanate mixture of a uretdione diisocyanate and from about 75% to about 95% by weight based on the weight of the diisocyanate mixture of a monomeric organic diisocyanate, said diisocyanate mixture being present in a quantity such that the —NCO to —OH ratio is from about 0.9 to about 1.2.

7. A method of preparing non-porous polyurethane polymers having thermoplastic properties which comprises reacting at a temperature less than 100° C. an organic compound containing active hydrogen atoms which are reactive with —NCO groups said compounds having a molecular weight of from about 500 to about 3000 and selected from the group consisting of hydroxyl polyesters, polyhydric polyalkylene ethers, polyester amides, polyhydric polythioethers and polyacetals and a chain-extending agent selected from the group consisting of water and glycols, with a diisocyanate mixture of at least 5% by weight of a uretdione diisocyanate and at least 50% by weight of a monomeric organic diisocyanate, said diisocyanate mixture being present in a quantity such that the —NCO to —OH ratio is from about 0.9 to about 1.2.

8. A method of preparing non-porous polyurethane polymers having thermoplastic properties which comprises reacting at a temperature less than 100° C. an organic compounnd containing active hydrogen atoms which are reactive with —NCO groups said compound having a molecular weight of from about 500 to about 3000 and selected from the group consisting of hydroxyl polyesters, polyhydric polyalkylene ethers, polyester amides, polyhydric polythioethers and polyacetals and a chain-extending agent selected from the group consisting of water and glycols, with a diisocyanate mixture of a uretdione diisocyanate and from about 75% to about 95% by weight based on the weight of the diisocyanate mixture of a monomeric organic diisocyanate, said diisocyanate mixture being present in a quantity such that the —NCO to —OH ratio is from about 0.9 to about 1.2.

9. The process of claim 8 wherein said organic compound is an hydroxyl polyester.

10. The process of claim 8 wherein said organic compound is a polyhydric polyalkylene ether.

11. The process of claim 8 wherein said organic compound is a polyester amide.

12. The process of claim 8 wherein said organic compound is a polyethioether.

13. The process of claim 8 wherein said organic compound is a polyacetal.

14. A method for making thermoplastic polyurethane which comprises mixing
(1) a substantially anhydrous organic compound having reactive hydrogen atoms determinable by the "Zerewitinoff" method and reactive with an —NCO group, said organic compound having a molecular weight of from about 500 to about 3000, with
(2) both an organic diisocyanate containing uretdione groups and an organic diisocyanate free from uretdione groups, said organic diisocyanate free from uretdione groups being present in a quantity of at least 50% by weight and said diisocyanate containing uretdione groups being present in a quantity of at least 5% by weight based on the weight of isocyanates, and
(3) a difunctional chain-extender selected from the group consisting of water and glycols, the amount of reactive hydrogen and —NCO groups in the mixture being substantially stoichiometrically equivalent reacting the resulting mixture at a temperature below about 100° C. until chain lengthening occurs through reaction of the —NCO groups with reactive hydrogen atoms without appreciable loss of uretdione groups, pouring the resulting clear melt into a suitable container and heating the melt at from about 80/100° C. to form a thermoplastic product adapted to be fabricated by thermoplastic techniques.

15. A method of making thermoplastic polyurethanes which comprises
(1) dissolving a uretdione diisocyanate in an organic compound containing active hydrogen atoms which which are reactive with —NCO groups, said compound having a molecular weight of from about 500 to about 3000, and a chain-extending agent selected from the group consisting of water and glycols, and adding to said solution a monomeric diisocyanate, said monomeric diisocyanate being present in an amount of at least 50% by weight and said diisocyanate containing uretdione groups being present in a quantity of at least 5% by weight based on the weight of isocyanates, the —NCO groups of the isocyanates and active hydrogen groups of the organic compound and chain-extending agent being present in substantially stoichiometrically equivalent amounts, reacting the resulting mixture at a temperature below about 100° C. until chain lengthening occurs through reaction of the —NCO groups with reactive hydrogen atoms without appreciable loss of uretdione groups, pouring the resulting clear melt into a suitable container and heating the melt at from about 80/100° C. to form a thermoplastic product adapted to be fabricated by thermoplastic techniques.

References Cited by the Examiner

UNITED STATES PATENTS

| 2,929,800 | 3/1960 | Hill | 260—77.5 |
| 3,047,540 | 7/1962 | Merten et al. | 260—77.5 |
| 3,099,642 | 7/1963 | Holtschmidt et al. | 260—75 |

FOREIGN PATENTS

| 802,189 | 10/1958 | Great Britain. |

LEON J. BERCOVITZ, *Primary Examiner.*